United States Patent
Hashberger et al.

(10) Patent No.: US 9,908,623 B2
(45) Date of Patent: Mar. 6, 2018

(54) WALL MOUNTED STOWAGE COMPARTMENT

(71) Applicant: B/E AEROSPACE, INC., Winston Salem, NC (US)

(72) Inventors: Frank E. Hashberger, Snohomish, WA (US); David R. Benton, Edmonds, WA (US)

(73) Assignee: B/E Aerospace, Inc., Winston Salem, NC (US)

( * ) Notice: Subject to any disclaimer, the term of this patent is extended or adjusted under 35 U.S.C. 154(b) by 0 days.

(21) Appl. No.: 14/270,567

(22) Filed: May 6, 2014

(65) Prior Publication Data
US 2014/0332629 A1    Nov. 13, 2014

Related U.S. Application Data

(60) Provisional application No. 61/821,895, filed on May 10, 2013.

(51) Int. Cl.
*B64D 11/00* (2006.01)
*B64D 11/02* (2006.01)
*B64D 11/06* (2006.01)

(52) U.S. Cl.
CPC .............. *B64D 11/00* (2013.01); *B64D 11/02* (2013.01); *B64D 11/06* (2013.01);
(Continued)

(58) Field of Classification Search
CPC ............ B60N 2/01525; B60N 2/01533; B60N 2/0155; B60N 3/004; B64D 11/06;
(Continued)

(56) References Cited

U.S. PATENT DOCUMENTS

| | | | |
|---|---|---|---|
| 3,738,497 A | 6/1973 | Betts et al. | |
| 4,776,903 A | 10/1988 | Nordskog | |

(Continued)

FOREIGN PATENT DOCUMENTS

| | | | | |
|---|---|---|---|---|
| DE | 202004008069 | | 7/2004 | |
| EP | 2179920 A2 | * | 4/2010 | ............... B64C 1/18 |
| JP | 2009-12756 | | 1/2009 | |

OTHER PUBLICATIONS

International Search Report, Sep. 10, 2014, 5 pages, from PCT/US2014/03748 (with priority from U.S. Appl. No. 14/270,567), published with WO2014/183207, dated Nov. 13, 2014.

(Continued)

*Primary Examiner* — Assres H Woldemaryam
(74) *Attorney, Agent, or Firm* — Donna P. Suchy

(57) ABSTRACT

A wall mounted stowage compartment for a passenger cabin of an aircraft includes a housing having a rearwardly facing wall mounted to a forwardly facing interior monument wall. The stowage compartment is located under an aft most passenger seat adjacent to the forwardly facing interior monument wall. The stowage compartment includes a stowage compartment drawer, and a protective breathing equipment compartment is mounted to a side wall of the aircraft cabin monument, and includes a forwardly facing edge that follows a contour of the forwardly facing wall of the aircraft cabin monument extending from a forwardly facing recess to the floor of the cabin.

18 Claims, 3 Drawing Sheets

(52) U.S. Cl.
CPC ...... *B64D 11/0602* (2014.12); *B64D 11/0629* (2014.12); *B64D 11/0632* (2014.12)

(58) Field of Classification Search
CPC . B64D 11/0636; B64D 11/0638; B64D 11/00; B64D 11/02; B64D 11/0629; B64D 11/0602; B64D 11/0632
USPC ............ 244/118.6, 118.5, 1 R, 129.1, 117 R; 297/217.1
See application file for complete search history.

(56) References Cited

U.S. PATENT DOCUMENTS

| | | | |
|---|---|---|---|
| 4,884,767 A | 12/1989 | Shibata | |
| 6,074,000 A * | 6/2000 | Wagner | 297/188.11 |
| 6,152,400 A * | 11/2000 | Sankrithi | B64D 11/00 105/315 |
| 6,182,926 B1 | 2/2001 | Moore | |
| 6,520,451 B1 | 2/2003 | Moore | |
| 6,742,840 B2 | 6/2004 | Bentley | |
| 7,240,943 B2 * | 7/2007 | Williamson et al. | 296/37.15 |
| 7,284,287 B2 | 10/2007 | Cooper et al. | |
| 7,914,074 B2 * | 3/2011 | Lindsay | 297/188.13 |
| 8,590,838 B2 * | 11/2013 | Cook et al. | 244/118.6 |
| 2005/0288104 A1 * | 12/2005 | Walsh | 463/46 |
| 2007/0061971 A1 * | 3/2007 | DeBraal et al. | 5/617 |
| 2009/0050738 A1 | 2/2009 | Breuer et al. | |
| 2011/0121134 A1 * | 5/2011 | Schotte et al. | 244/118.5 |
| 2012/0112505 A1 * | 5/2012 | Breuer et al. | 297/217.1 |
| 2012/0255123 A1 * | 10/2012 | Buege et al. | 5/611 |
| 2012/0325964 A1 * | 12/2012 | Hawkins et al. | 244/118.6 |
| 2013/0328361 A1 * | 12/2013 | Egan | 297/188.01 |
| 2014/0084647 A1 * | 3/2014 | Darbyshire et al. | 297/217.1 |
| 2014/0117156 A1 * | 5/2014 | Boren | B64D 11/02 244/118.6 |
| 2014/0166808 A1 * | 6/2014 | Boenning et al. | 244/118.6 |
| 2014/0312173 A1 * | 10/2014 | Ehlers | B64D 11/06 244/118.6 |

OTHER PUBLICATIONS

Petition for Post Grant Review of U.S. Design Patent No. D764,031 filed Apr. 10, 2017 and assigned PGR No. PGR2017-00019.
Petition for Inter Partes Review of U.S. Pat. No. 9,365,292 filed Apr. 13, 2017 and assigned IPR No. IPR2017-01274.
Petition for Inter Partes Review of U.S. Pat. No. 9,073,641 filed Apr. 13, 2017 and assigned IPR No. IPR2017-01275.
Petition for Inter Partes Review of U.S. Pat. No. 9,440,742 filed Apr. 13, 2017 and assigned IPR No. IPR2017-01276.
Final Written Decision in IPR2014-00727 under 35 U.S.C. § 318; 37 C.F.R. § 42.73.
Declaration of Alan Anderson Under 37 C.F.R. § 1.68.
Rendering of the KLM Crew Rest.
Declaration of Paul Sobotta executed Apr. 2, 2015 and submitted in IPR2014-00727.
Image of B/E Aerospace "Spacewall," available at <http://beaerospace.com/products/structures-and-integration/737-advanced-lavatory/>.
Unopposed Motion to Withdraw Motion for Preliminary Injunction in *B/E Aerospace, Inc.* v. *Zodiac Aerospace, et al.*, No. 2:14-cv-210, Dkt. 47 (E.D. Tex. Jun. 6, 2014).
Voluntary Dismissal in *B/E Aerospace, Inc.* v. *Zodiac Aerospace, et al.*, No. 2:14-cv-210, Dkt. 50 (E.D. Tex. Jun. 19, 2014).
Patent Owner's Opening Brief in Federal Circuit Appeal Nos. 16-1496, 16-1497.
Declaration of Scott Savian, dated Mar. 20, 2017, including Exhibits A-E thereto.
Declaration of Vince Huard, dated Mar. 10, 2017, including Exhibits A-I thereto.
McDonnell Douglas DC-10 Customer Configuration Summary (a/k/a Orange Book), revised Oct. 1978 (the "Orange Book").
Declaration of Ronald Kemnitzer executed Apr. 10, 2017 and submitted in PGR2017-00019.
B/E Aerospace Press Release regarding Investor Day Webcast dated Mar. 12, 2012.
Letters from Petitioner, C&D Zodiac, Inc. to Patent Owner, B/E Aerospace, Inc. regarding Prior Art.
B/E Aerospace Investor Day Presentation dated Mar. 12, 2012.
"New aircraft lav sees B/E Aerospace flushed with success," Apex Editor's Blog Article dated Apr. 19, 2013.
SEC Exhibit 99.1—B/E Aerospace News Release—"B/E Aerospace Wins Exclusive Boeing Award; Program Estimated Value in Excess of $800 Million.".
B/E Aerospace's Complaint for Patent Infringement in *B/E Aerospace, Inc.* v. *Zodiac Aerospace, Inc. et al.*, No. 2:14-cv-01417 (E.D. Tex., Dec. 15, 2016).
Declaration of R. Klaus Brauer, submitted during prosecution of U.S. Appl. No. 14/709,378.
Declaration of Mitchell Freeman, submitted during prosecution of U.S. Appl. No. 14/709,378.
Screen capture from website of Tony Bravetti, available at <http://www.tonybravetti.com/my-work-edited>.
B/E Aerospace News Release—"Boeing Delivers First of 100 Next-Generation 737s to Delta Air Lines Configured with Numerous B/E Aerospace Systems and Products.".
Japanese Office Action dated Nov. 15, 2016 in Patent Application No. 2016-513116 (with English translation).

* cited by examiner

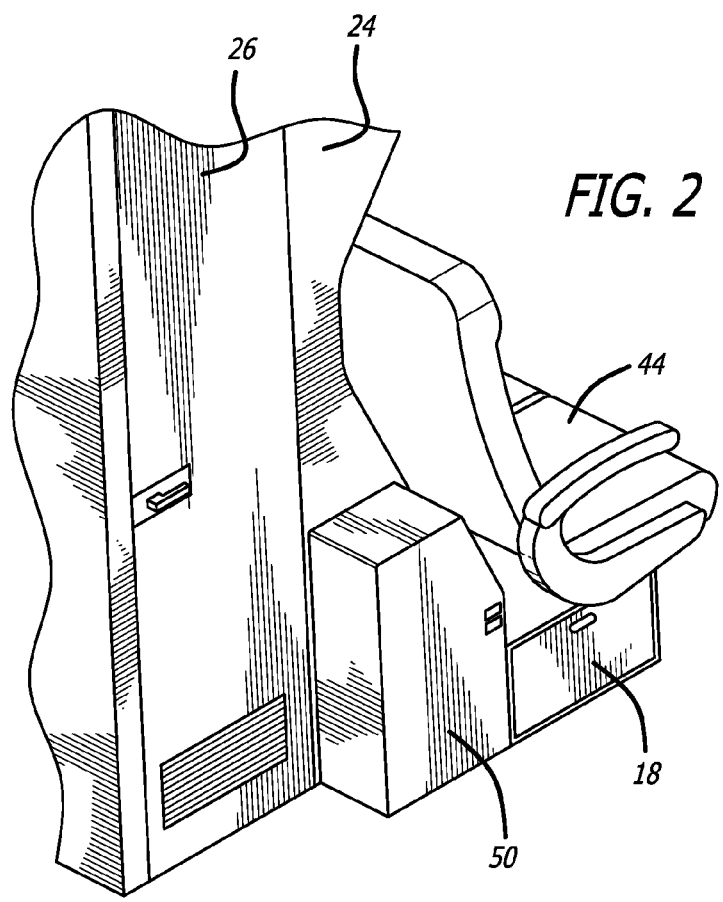
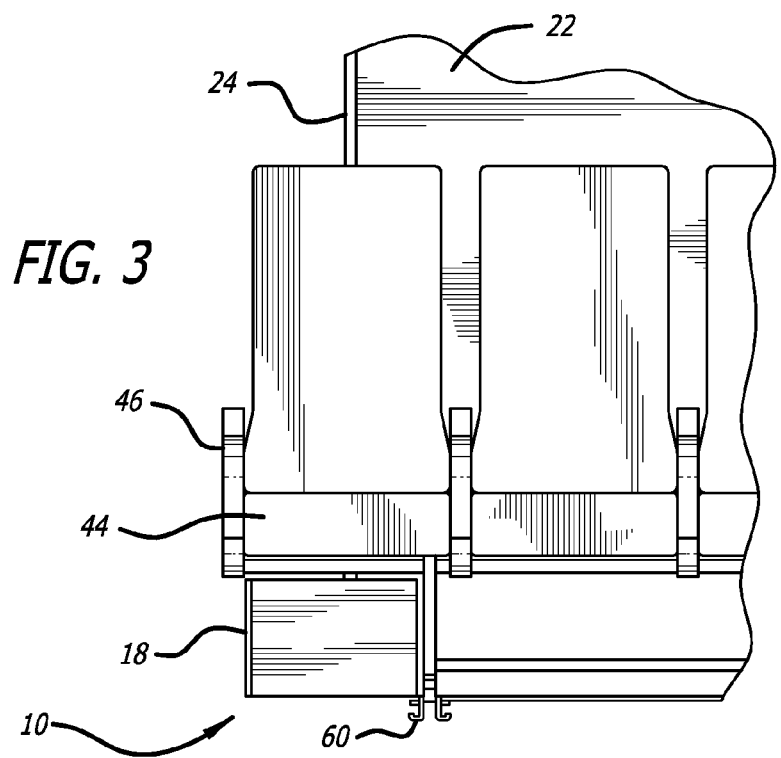

WALL MOUNTED STOWAGE COMPARTMENT

CROSS-REFERENCES TO RELATED APPLICATIONS

This application is based upon and claims priority from U.S. Application No. 61/821,895, filed May 10, 2013, incorporated by reference in its entirety.

BACKGROUND OF THE INVENTION

This invention relates to aircraft enclosures, and more particularly relates to an aircraft stowage unit, and more particularly relates to an aircraft cabin stowage compartment that is attached to a wall of an aircraft cabin interior commodity or monument, such as a lavatory, galley, or closet.

In a conventional prior art installation of an interior monument such as a lavatory immediately aft of and adjacent to an aircraft passenger seat, a seat track mounted stowage box, such as for emergency equipment, miscellaneous items or the like, is commonly located in an area between the last or aft most seat-row of aircraft passenger seating and the interior monument. However, in some cases, the aft most seat is placed in such close proximity to the interior monument that insufficient space is available for a seat track attachment for the installation of such a stowage box.

The last or aft most seat-row of an aircraft passenger cabin typically does not allow the stowage of passenger carry-on items under the seat-row, and typically overlaps or projects beyond a side wall of the interior monument in a manner that allows access to an area under the seating from an aft portion of the seating. However, such space is typically unused on many aircraft. In addition, the current introduction of contoured walls on aircraft interior commodities or monuments adjacent to such passenger seating also increases the likelihood that the last or aft most seats will be placed sufficiently close to the adjacent commodities or monuments to essentially eliminate space for stowage between the last or aft most row of seating and the adjacent commodities or monuments.

It would be desirable to provide a wall mounted stowage compartment that makes use of the otherwise unused space available under a last or aft most row of passenger seats adjacent to or in close proximity to a forwardly facing wall of an aircraft cabin monument. It also would be desirable to provide such a wall mounted stowage compartment that attaches to an aft, forwardly facing interior monument wall, to recover the capability to stow items in this location, such as emergency equipment, other miscellaneous items and the like. The present invention meets these and other needs.

SUMMARY OF THE INVENTION

Briefly, and in general terms, the invention provides for a wall mounted stowage compartment for a passenger cabin of an aircraft, having a forwardly facing interior monument wall and a last or aft most passenger seat in a last row or aft most row of passenger seats.

The present invention accordingly provides for a wall mounted stowage compartment that includes a housing having a rearwardly facing wall that is mounted to the forwardly facing interior monument wall. The stowage compartment is located under and extends under the last or aft most passenger seat in the last row or aft most row of passenger seats, which are preferably adjacent to or in close proximity to the forwardly facing interior monument wall.

In a presently preferred aspect, the aircraft cabin monument comprises a lavatory. In another presently preferred aspect, the aircraft cabin monument also includes a side wall and a monument or lavatory door in the side wall. In another presently preferred aspect, the passenger seat includes a seat back having an aft portion with a rearwardly facing aft most exterior surface that is substantially not flat in a vertical plane and generally conforming to a shape of a forwardly facing recess formed in the forwardly facing interior monument wall that is also substantially not flat in the vertical plane. In another presently preferred aspect, the seat back has an upright position and a reclined position such that rearwardly facing aft most exterior surface of the seat back extends within the forwardly facing recess.

In another presently preferred aspect, the stowage compartment includes a stowage compartment drawer. In another presently preferred aspect, a protective breathing equipment compartment or emergency medical kit is mounted to the side wall of the aircraft cabin monument, which includes a forwardly facing edge that generally follows a contour of the forwardly facing wall of the aircraft cabin monument extending from the forwardly facing recess to the floor of the cabin.

Other features and advantages of the present invention will become apparent from the following detailed description of the preferred embodiments in conjunction with the accompanying drawings, which illustrate, by way of example, the operation of the invention.

BRIEF DESCRIPTION OF THE DRAWINGS

FIG. 2 is a rear perspective view of the wall mounted stowage compartment of FIG. 1, showing the stowage compartment door and protective breathing equipment door closed.

FIG. 3 is a front view of the wall mounted stowage compartment of FIG. 1.

DETAILED DESCRIPTION OF THE PREFERRED EMBODIMENTS

Figure 1:
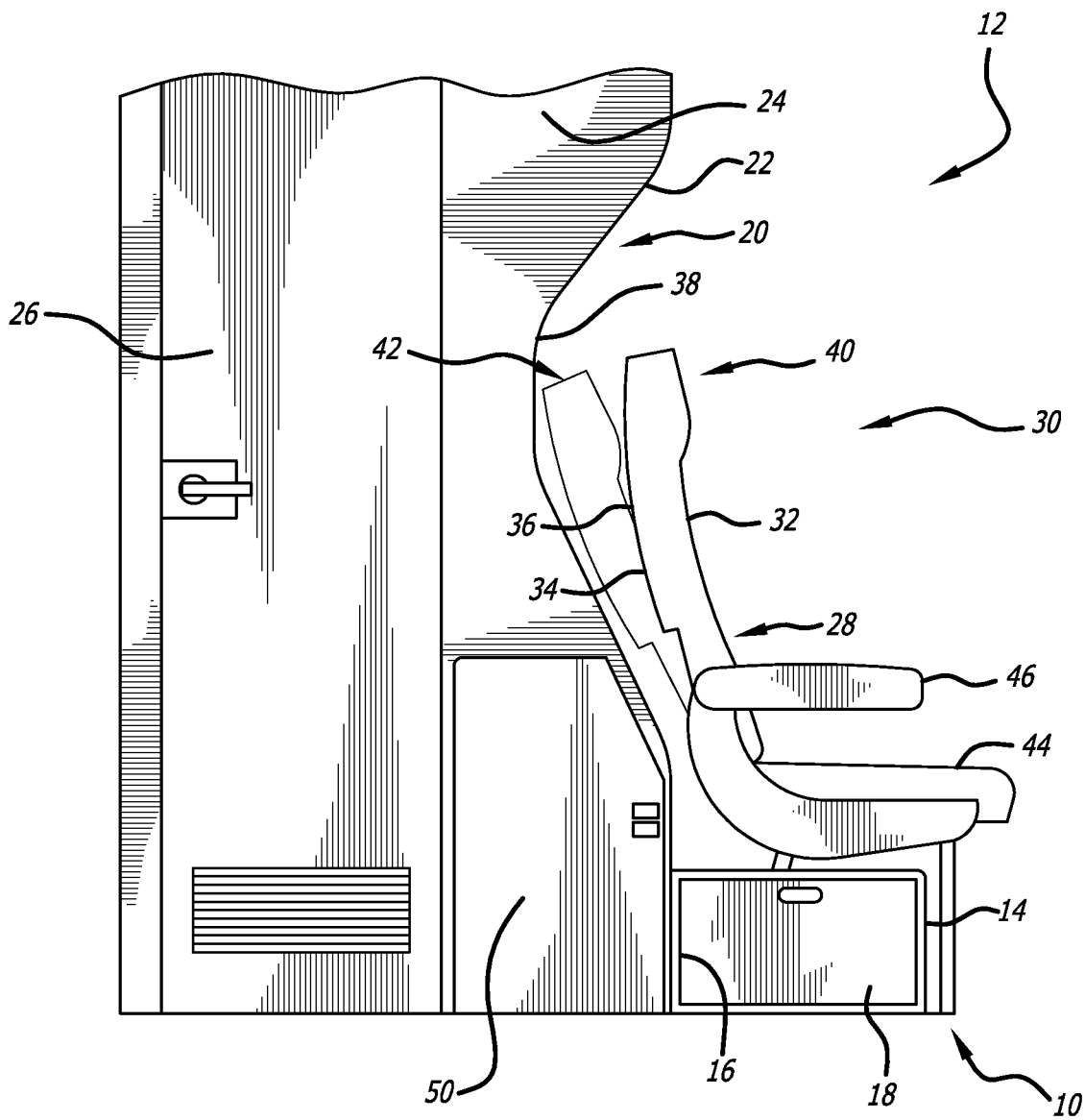
FIG. 1 is a side elevational view of a wall mounted stowage compartment in a passenger cabin, according to the present invention.

Referring to the drawings, which are provided for purposes of illustration and by way of example, the present invention provides for stowage compartment 10 for a passenger cabin 12 of an aircraft (not shown). The stowage compartment includes a housing 14 having a rearwardly facing wall 16, and preferably includes a drawer 18 that is slidably contained within the housing. The passenger cabin includes an aircraft cabin monument 20 such as a lavatory, having a forwardly facing interior monument wall 22, and typically having a side wall 24 and a monument or lavatory door 26, although the aircraft cabin monument may also be an aircraft closet, or an aircraft galley, or another similar enclosed or structurally defined space, for example.

Figure 4:
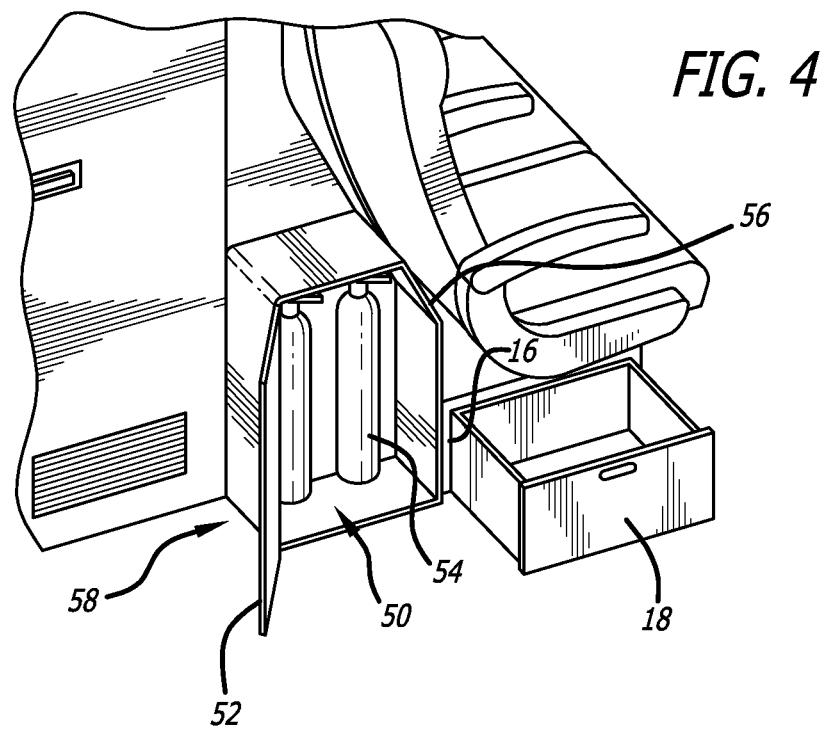
FIG. 4 is a side perspective view similar to FIG. 2, showing the stowage compartment door and protective breathing equipment door open.
Figure 5:
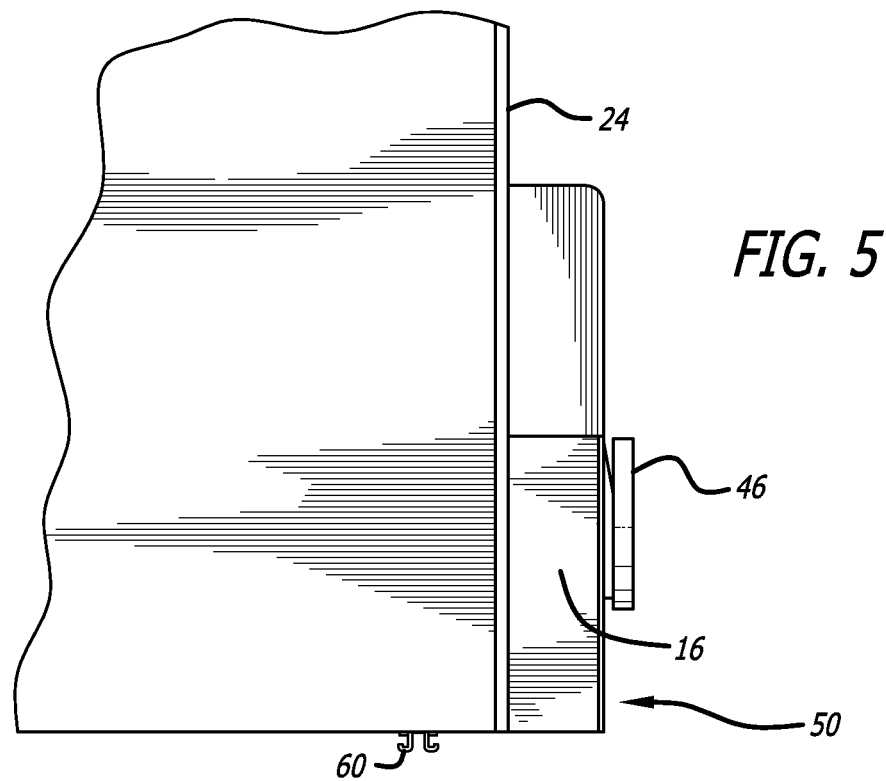
FIG. 5 is a rear view of the wall mounted stowage compartment of FIG. 1.

The stowage compartment preferably is mounted to the forwardly facing interior monument wall under a last or aft most passenger seat 28 such as in a last row or aft most row of passenger seats 30 located adjacent to or in close proximity to the forwardly facing interior monument wall. The housing of the stowage compartment preferably is located under and extends under the aft most passenger seat in the last row or aft most row of passenger seats adjacent to the forwardly facing interior monument wall. The last or aft most passenger seat includes a seat back 32, having an aft portion 34 with a rearwardly facing aft most exterior surface 36 that is substantially not flat in a vertical plane, and that generally conforms to a shape of a forwardly facing recess 38 formed in the forwardly facing interior monument wall, that is also substantially not flat in the vertical plane. As is illustrated in FIG. 1, the seat back has an upright position 40 and a reclined position 42 such that the rearwardly facing aft most exterior surface of the seat back extends within the forwardly facing recess. The passenger seat also preferably includes a seat cushion 44 and an arm rest 46. As is illustrated in FIG. 5, the seat back typically overlaps and extends beyond the side wall of the aircraft cabin monument, and the arm rest typically overlaps and extends beyond a protective breathing equipment (PBE) compartment 50 that is mounted to the side wall of the aircraft cabin monument, although the protective breathing equipment compartment may alternatively house an emergency medical kit or other equipment, for example. The protective breathing equipment compartment may optionally be formed as a part of the stowage compartment or may be connected to or mounted to the stowage compartment. Referring to FIG. 4, the protective breathing equipment compartment typically includes a protective breathing equipment door 52 providing access to oxygen bottles 54 and a protective breathing equipment hood or mask (not shown). The protective breathing equipment compartment typically includes a forwardly facing edge 56 that generally follows the contour of the forwardly facing wall of the aircraft cabin monument extending from the forwardly facing recess to the floor 58 of the cabin. Referring to FIG. 3, a seat track 60 is also provided adjacent to the stowage compartment under the last row or aft most row of passenger seats for mounting of the last row or aft most row of passenger seats to the floor of the cabin.

As should be readily apparent, it would also be possible to make the stowage compartment drawer longer, or to add a smaller stowage compartment door above the stowage compartment drawer. The oxygen bottles may also be accommodated in the stowage compartment drawer, which can be large enough for protective breathing equipment or emergency medical kit or other equipment, or other miscellaneous items of a similar size. The stowage can also be taller in areas where the aisle clearance permits, and the door of the monument or lavatory may be a bi-fold, articulating or translating type of door to avoid interference of opening of the door with the protective breathing equipment compartment or stowage compartment.

It will be apparent from the foregoing that, while particular forms of the invention have been illustrated and described, various modifications can be made without departing from the spirit and scope of the invention. Accordingly, it is not intended that the invention be limited, except as by the appended claims.

We claim:

1. A monument for a passenger cabin of an aircraft, comprising:
  a forwardly facing interior monument wall having a forwardly facing recess formed in the forwardly facing interior monument wall that is substantially not flat in a vertical plane;
  a side wall connected to said forwardly facing interior monument wall, said side wall being adjacent an aisle area; and
  a protective breathing equipment compartment mounted to the side wall, wherein the protective breathing equipment compartment is configured to extend a first distance from a plane defined by the side wall laterally toward an aisle area, said first distance being smaller than a second distance that a passenger seat positioned adjacent the forwardly facing wall extends from the plane defined by the side laterally toward the aisle area.

2. The monument of claim 1, wherein said passenger seat is nested into the forwardly facing interior monument wall when in an upright or unreclined position.

3. The monument of claim 1, wherein the monument comprises a lavatory.

4. The monument of claim 1, wherein a seat back of the passenger seat includes an aft portion with a rearwardly facing aft most exterior surface that is substantially not flat and that generally conforms to a shape of the forwardly facing recess formed in the forwardly facing interior monument wall.

5. The monument of claim 4, wherein the seat back has an upright position and a reclined position such that the rearwardly facing aft most exterior surface of the seat back extends within the forwardly facing recess when the seat in is a reclined position.

6. The monument of claim 1, wherein said protective breathing equipment compartment includes a forwardly facing surface that follows a contour of the forwardly facing interior monument wall.

7. The monument of claim 1, further comprising a housing including a rearwardly facing wall mounted to the forwardly facing interior monument wall and extending under the passenger seat.

8. The monument of claim 7, wherein the housing comprises a stowage compartment drawer.

9. The monument of claim 8, wherein the passenger seat is an aisle seat, and wherein the stowage compartment drawer is configured to open into an aisle of the aircraft.

10. The monument of claim 8, further comprising a door adjacent the stowage compartment drawer.

11. A monument for a passenger cabin of an aircraft, comprising: a forwardly facing interior monument wall having a forwardly facing recess formed in the forwardly facing interior monument wall that is substantially not flat in the vertical plane; a side wall connected to said forwardly facing interior monument wall; and a protective breathing equipment compartment mounted to the side wall; wherein the forwardly facing recess is configured to accept an exterior surface of a portion of a seat back of a forward positioned passenger seat, the seat back having an aft portion with a rearwardly facing aft most exterior surface that is substantially not flat in a vertical plane, wherein, when the passenger seat is in a reclined position, the aft most exterior surface of the back seat is nested within the forwardly facing recess; and wherein the arm rest overlaps and extends laterally beyond said protective breathing equipment compartment, and said seat back laterally extends beyond said side wall.

12. The monument of claim 11, wherein said passenger seat is at least partially nested within the forwardly facing recess when the seat is in an upright or reclined position.

13. The monument of claim 11, wherein the monument comprises a lavatory.

14. The monument of claim 11, further comprising a stowage compartment drawer adjacent to the protective breathing equipment compartment.

15. The monument of claim 11, wherein said protective breathing equipment compartment includes a forwardly facing edge that follows a contour of the forwardly facing wall of the aircraft cabin monument extending from the forwardly facing recess to the floor of the cabin.

16. The monument of claim 11, further comprising a housing including a rearwardly facing wall mounted to the forwardly facing interior monument wall and extending under the passenger seat.

17. The monument of claim 16, wherein the housing comprises a stowage compartment drawer.

18. The monument of claim 17, wherein the passenger seat is an aisle seat, and wherein the stowage compartment drawer is configured to open into an aisle of the aircraft.

* * * * *